UNITED STATES PATENT OFFICE.

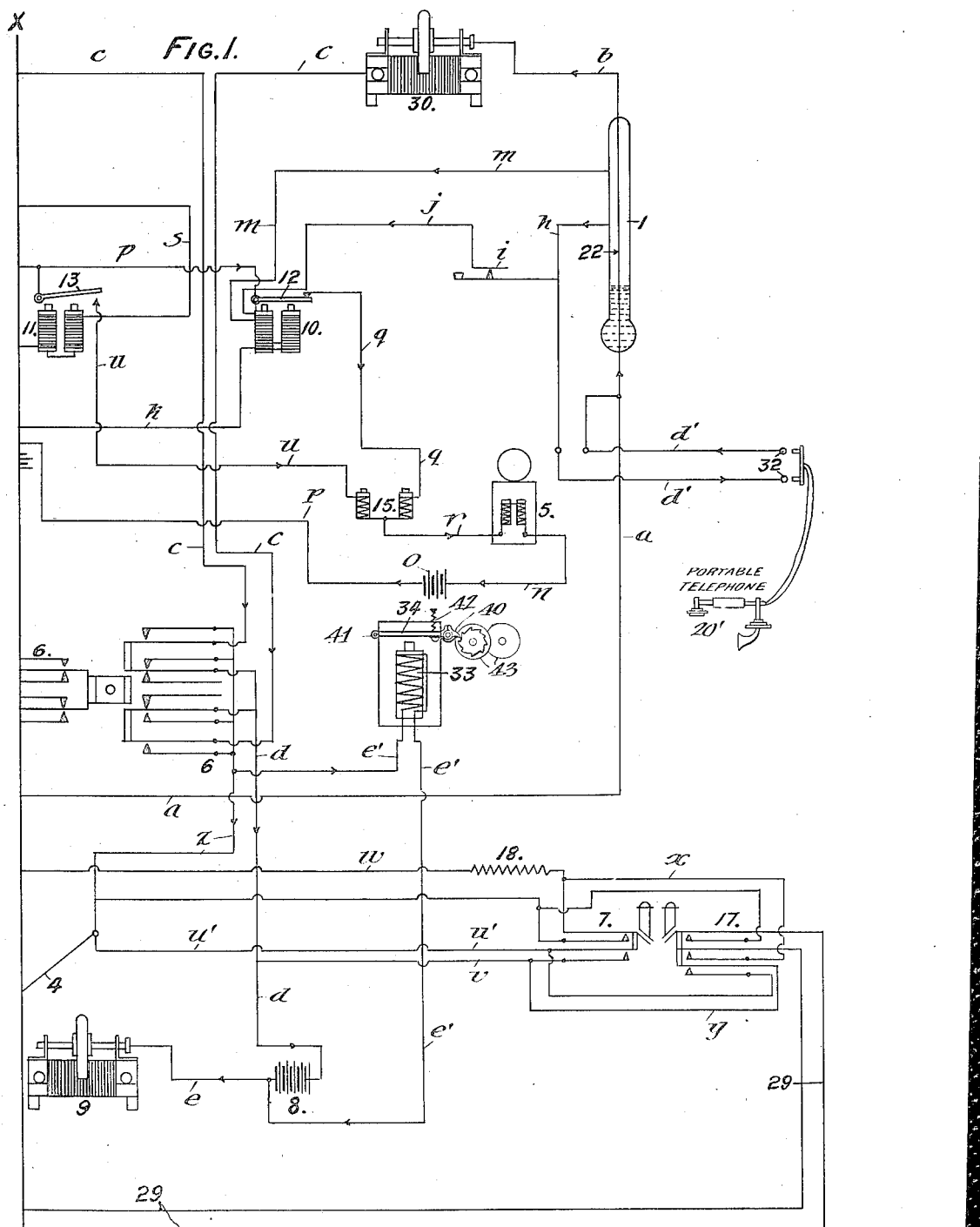

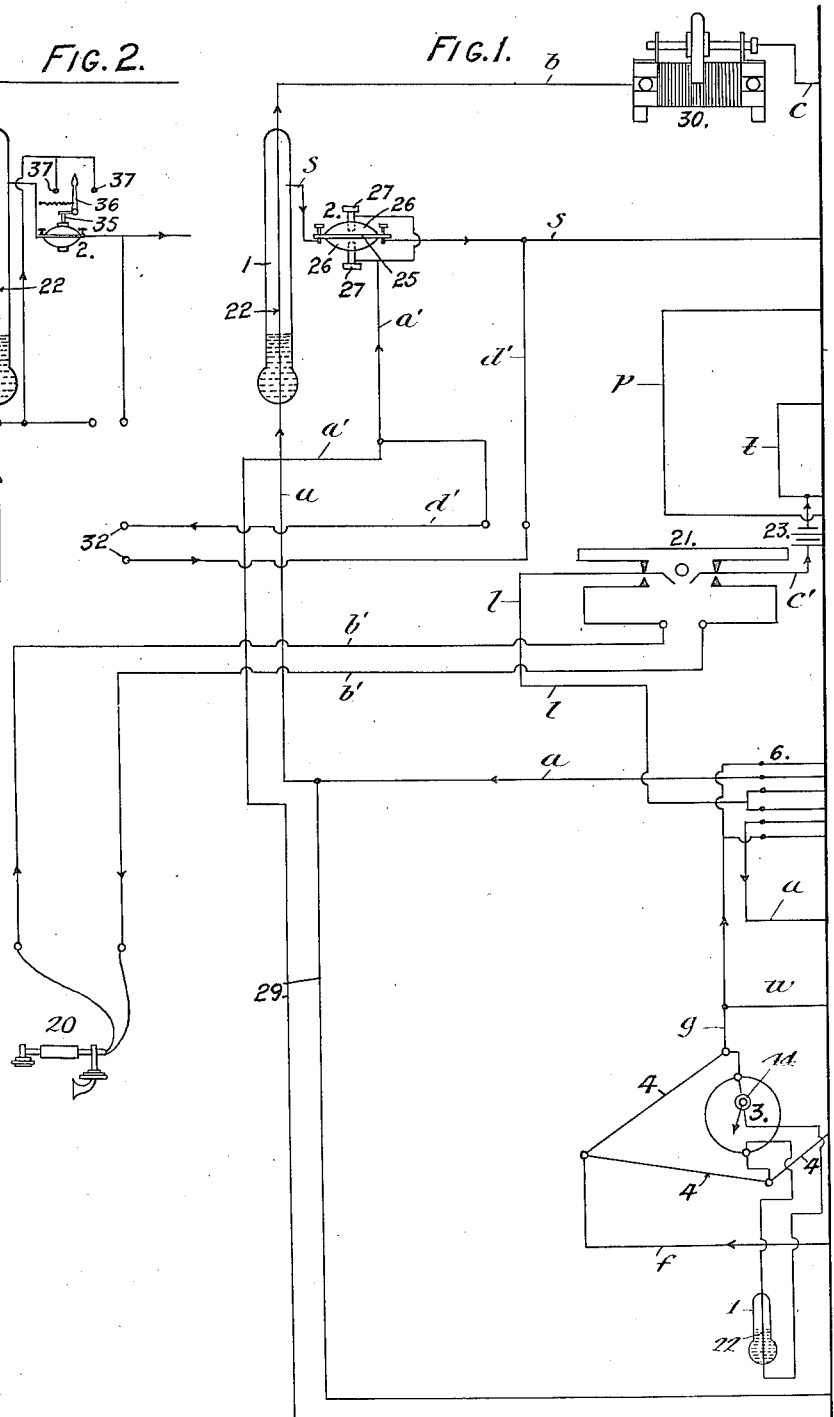

ARTHUR BARRY, OF LIVERPOOL, ENGLAND.

TEMPERATURE INDICATING OR RECORDING SYSTEM AND APPLIANCE.

1,194,808.

Specification of Letters Patent.

Patented Aug. 15, 1916.

Application filed January 31, 1914. Serial No. 815,645.

*To all whom it may concern:*

Be it known that I, ARTHUR BARRY, subject of the King of England, residing at 44 Errol street, Aigburth, Liverpool, in the county of Lancaster, England, have invented new and useful Improvements in or Connected with Temperature Indicating or Recording Systems and Appliances, of which the following is a specification.

This invention has reference to systems and appliances for indicating or recording temperatures from a distance, and of the type wherein a plurality of thermometers of the type herein described are disposed or placed in different positions, and the temperatures of stations, spaces, things, or surrounding conditions received by these thermometers are transmitted to, indicated or recorded by a single or common receiving indicating or recording instrument or apparatus at the receiving station, so that it will or may be adapted to serve to indicate and record the temperature of any and all of these stations, spaces, things, or surrounding conditions; and also, in some cases, if desired, an alarm or sound indication, as well as a visual indication or recording may be given or effected, when the temperature of any one station, space, et cetera, reaches or passes beyond a pre-determined limit in either direction or point.

The chief objects of the present invention are to provide improvements, generally, in connection with systems and appliances of this kind, by which their accuracy may be insured, and various parts tested and brought to a constant condition, so that the several parts of the system and appliances, as a whole, shall be rendered accurate and constant under all varying conditions of temperature, power, et cetera, as hereinafter explained; while at the same time, a further object is to provide appliances of the kind, which are simple, inexpensive, and reliable.

In order that the invention may be readily understood it will be described with reference to the accompanying drawings which illustrate it, and in which—

Figure 1 is a diagrammatic view illustrating the apparatus and the various electrical connections; and Fig. 2 is a diagrammatic detail view of a modification hereinafter referred to.

In this system and apparatus, I will first describe a part which is directly connected with the indication or recording of temperatures from a distance, through the testing instrument operated by hand; and also, those parts for automatically indicating or making known at the receiving station, preselected minima and maxima or any special temperature of the places in which the thermometric transmitting devices are placed. And, secondly, the various means for testing and adjusting the different portions of the lines, instruments and parts, for maintaining these in the required constant and correct condition will be described; and finally, there will be described the means and parts connected with the means for adjusting and setting the indicator and thermometers when installing, and subsequently using the systems.

With the exception of the thermometric devices which are placed in the rooms or spaces, the temperatures of which it is desired to indicate, and which constitute the temperature transmission apparatus, portions of the apparatus and appliances given in the diagram are placed in the receiving and indicating or recording station.

In the drawings, 1, 2, represent thermometric apparatus placed at a distance; while at the receiving and recording station, there is situated the indicating or recording instrument 3, comprising a single or common electrical meter bridge 4; a bell or other sounding instrument 5; means such as a key switch, or like switch 6, for closing and opening the circuits of the first portion of the system referred to, for ascertaining the temperatures at which any and each of the thermometers is standing; a switch 7 for testing the bridge battery 8 in the system and the lines and indicator instrument 3, 4; an adjustable rheostat 9 in connection with these lines and instrument 3, 4; electromagnetic appliances 10, 11 connected with the maxima and minima or special indications of the thermometric devices, operating in connection with the switches 12, 13, respectively; and a "drop" or other equivalent visible indicator signal instrument 15, or the like; and the sound signaling instrument 5; such appliances constituting an automatic means, for indicating the maximum and minimum, or other predetermined temperatures.

Further, in the receiving or indicating and recording station, adjusting means are provided in the thermometric lines consisting of adjustable rheostats for testing and adjusting the thermometers or thermometric devices, and their systems, so as to transmit their temperatures correctly, and synchronize with one another.

In another part of the apparatus, viz: that part for testing the main battery 8, and line, and regulating means connected with it, there is combined with the thermometer testing and reading switches, 7, 6, and the bridge instrument 3, a switch device 17; and in connection with this switch and the bridge, a standard resistance 18 is provided on the line, which can be placed where desired and will constitute the fourth arm of the bridge; this resistance being one having no temperature coefficient, such as a manganin resistance; and by means of this switch and means, the temperature coefficient testing can be accomplished.

Further instruments in the indicating and recording station, are a telephone 20, and key or like switch device 21 connected with the indicator thermometers and telephone, for adjusting and setting the thermometer when installing and subsequently using the system; while in this connection, also, at the places where the thermometric devices are placed, the apparatus is arranged with lines and connections, by which a portable telephone instrument is adapted to be used.

All the portions of the whole system as will be seen by the diagram, are connected by "lines" and inter-connected in the manner indicated in the diagram, so that the several actions and functions can be performed.

The thermometers 1 shown in the diagram will be assumed to be of the type having a bulb and capillary tube containing mercury, and with a filament 22 of suitable section passing through it, and connected up at the top and bottom with the line controlled by the switch 6. The electrical connections consisting of leads $a$ from the switch 6 to the filament 22, and from the filament by leads $b$ to a rheostat 30, and from the latter by leads $c$ to part of the switch 6, thence by leads $d$ to battery 8, lead $e$ to adjustable rheostat 9, lead $f$ to bridge 4, and lead $g$ back to the switch. Then for every increase or decrease of temperature, or consequent decrease or increase respectively of resistance due to the rise and fall of the mercury over the filament, such amount of resistance is cut out or in by the rise and fall of the mercury in the capillary, by the shortening or lengthening, as it were, of the filament used in it; and by means of the connections previously set out and the switch 6, this current is conveyed when the circuit is closed by the switch 6, to the indicator 3, by way of the bridge 4; and according to the current flowing, which will correspond with the condition of the thermometer, so the indicator will indicate and show the temperature existing at the thermometer. While the latter circuit is in action, the circuit for controlling the automatic alarm signaling and indicating portion of instruments, including the bell 5, the electromagnet 10, with differential winding, the switch 12 of the electromagnet 10, the electromagnet 11 with a simple winding, the switch 13 of the electromagnet 11, and the indicator 15, for signaling and indicating the maximum and minimum temperatures, or any special temperature, is open.

In the maximum and minimum, and any special temperature circuit (which has a relay battery in it) the electromagnet devices 10, 11 are placed, each of which consists of a set of two electromagnets. One of such electromagnets 10, has a double or differential winding on it, and operates in connection with the switch 12; while the other is a simple wound magnet, and operates upon the switch 13.

In the case illustrated, the right hand thermometer is arranged for indicating or signaling automatically, by sound or sight, minimum and maximum temperatures, there being two lines sealed in the glass thermometer capillary tube 1, the ends of which project into the mercury duct. And these two connections are connected with the electromagnets 10; and the circuit for the minimum temperature comprises the sealed line $h$ in the right hand thermometer 1, switch $i$, lead $j$, electromagnet 10, lead $k$, battery 23, switch 21, lead $l$, switch 6, and lead $a$ to filament 22; and the circuit for the maximum temperature comprises the sealed line $m$, electromagnet 10, lead $k$ and the other parts of the minimum temperature connections previously recited. As regards the other thermometer 1, this is adapted to automatically signal or indicate when a maximum temperature is reached; and it only has one wire leading from its capillary duct, to an ordinary electromagnet 11 which operates upon the switch 13, connected with the bell and indicator (5) circuit.

With regard to the former case, when the mercury does not reach from below the lower line connection, then the electromagnet 10 is deënergized, and the switch 12 will be operated and close the bell indicator circuit, which leads from the bell 5 by lead $n$ to the bell circuit battery $o$, thence by lead $p$ to the switch 12, by lead $q$ to the indicator 15, and by lead $r$ back to the bell 5, whereas, when the mercury reaches the lower line, current flows through it to one of the windings of the magnet 10, and breaks the connection at the switch 12, and opens this bell circuit, so that the bell does not ring. But when the mercury reaches the upper line, then the other of the windings of the electromagnet 10 is energized, in addition to that produced by the aforesaid line; and these windings being so arranged that when these two circuits are closed, they act in opposite direction, so as to neutralize one another, therefore, the switch 12 is closed, and the bell and visible indicator is operated, and gives the signal or alarm of the maximum temperature having been reached. On the other hand, when the other or left hand thermometer 1 has only one temperature alarm arrangement used in connection with it, in such a case, current will only flow when the terminal of the line, which is inserted into the capillary tube, is touched by the mercury; whereupon, current flows through the magnets 11, and operates the switch 13, and closes the bell circuit, and may be common to any number of lines. In this case the circuits are as follows:—switch 6, lead $a$, filament 22, sealed lead $s$, electromagnet 11, lead $t$, battery 23, switch 21, and lead $l$ to switch 6; the bell circuit comprising switch 13, lead $u$, indicator 15, lead $r$, bell 5, lead $n$, battery $o$, and lead $p$.

The flexible diaphragm 25 of the appliance 2, is placed between the two chambers 26, both or one of which may contain alcohol or readily volatilizable liquid, and having adjustable terminal contact screws 27, screwing into same, which are connected up by wires $a^1$ to the main line wire $a$ of the thermometer 1; while the diaphragm 25 itself is connected with the maximum temperature line wire connected with the thermometer 1, which is also connected with the magnet 11.

In case the diaphragm device 2 alone were used for the thermometric purpose, the diaphragm would be connected directly to the main line. By this device 2, the upper contact 27 would come into action by the expansion or volatilization of the fluid in the lower chamber 26, which forces the diaphragm 25 on to it; while, when a minimum temperature exists, the diaphragm would fall back on to the lower contact 27. In either case bring into action the bell and drop or other signal relay. The electrical connections with the device 2 comprise the lead $s$, electromagnet 11, lead $t$, battery 23, switch 21, lead $l$, switch 6, lead $a$ and lead $a^1$. By the contacts 27 being screwed into or out of the apparatus more or less, the maximum and minimum, and any special positions or conditions at which the apparatus will come into action, may be varied at will.

With regard to the battery 8, and its testing and regulating means, there is employed in connection with them, the switches 7 and 6, and the bridge instrument 3, another switch device 17; and in connection with this switch, and the bridge instrument 3, the standard resistance 18 is employed, which is placed in the line between the switches 7 and 17, and the bridge members 4, and constitutes the fourth arm of the bridge; the resistance having no temperature co-efficient, such as is provided by a Maganin resistance; while in the line of the bridge battery 8, a rheostat or regulator 9 is employed which is of an adjustable character of any known form, by which the condition of the lines may be adjusted and brought to that required. The electrical connections of this portion of the apparatus for testing the bridge battery 8, comprise, in one part, the lead $e$, rheostat 9, lead $f$, the lower members 4 of the bridge, lead $u'$, switch 7, lead $v$, and lead $d$; and in the other part, battery 8, lead $e$, rheostat 9, lead $f$, the upper arm 4 of the bridge, lead $g$, lead $w$, manganin resistance 18, lead $x$, switch 17, lead $y$, lead $v$, and lead $d$ back to the battery 8.

To test the battery and its line, the key switch 7 is operated, and the circuit connected with the same closed; and if upon the test it is shown that adjustment is required due to the variation of the battery force, the adjustable rheostat 9 is adjusted, so as to bring the line back to the condition required.

An extra line wire marked 29 is run from one or any of the thermometers 1, through the resistance 18; such wire being of the same sectional area as the thermometer filament, and put in at will, by the switch 17, with one lead of the thermometer, and under the same conditions with the standard resistance 18 of the instrument 3. The electrical connections in this arrangement comprise resistance 18, lead $x$, switch 17, line wire 29, filament 22, lead $b$, rheostat 30, lead $c$, switch 6, lead $z$, bridge members 4, lead $g$ and lead $w$.

The rheostat 30 having a sliding or adjustable contact and setting device, or the like, for holding it in position when adjusted, is provided in one line of each thermometer lead. This means enables the rise and fall of the resistance of the line, due to the increase or decrease of temperature, to be observed by the instrument 3; and by the rheostats 30, the resistance of the various thermometer circuits which are, or may be unequal, can be quickly adjusted and synchronized.

With regard to the key switch 6, this is of the type by which one key may act for two or more thermometers as that indicated by the diagram.

The indicator instrument 3 is kept constant under different temperatures, by using in connection with it, a thermometer 1 of the character as set forth with reference to the accompanying drawing, having a resistance filament 22 of the kind described, which is in circuit with the coil 44 of the instrument 3, whereby as the temperature of this coil 44 rises, it cuts out more or less, this resistance, and so regulates and keeps constant the action of the coil 44 of the indicator.

With regard to the means for adjusting and setting the indicator 3, and the thermometers, in installing—and subsequently using—the system, there is employed as stated, in connection with the system, a telephone 20 at the indicating station, which is connected by leads $b^1$ with a key switch 21, which is connected up by one wire 1 with the thermometer line; and also with the line $c^1$ to the battery 23 connected with the electro-magnet 11. While at the thermometer, there are terminals 32 and wires $d^1$ connected up with the lines $a^1$ and $s$ or $a$ and $h$ of the system as indicated, and adapted to have connected with them a portable telephone $20^1$. By this means, that is, by the use of the telephone, in installing (or subsequent use), the indications of the thermometer, and those of the instrument indicator 3 or the pointer thereof on its dial, will be made to agree exactly. Further, there is used in combination with the indicator instrument 3 or its lines, means of recording the number of times the system is employed, so as to serve a check as to its use; and this consists of an electro-magnet 33, connected up with the battery by the leads $e^1$, and so adapted, that an armature 34 is moved by the magnet 33 when energized. And this armature is adapted to actuate through a pawl 40 or the like operated by the armature—which say is hinged at 41 and moves in one direction by a spring 42—numeral disks or wheels 43 on a counter of any known suitable form, say on the end of the thermo carrying magnet.

In Fig. 2 there is illustrated a modification of a thermo-electro-metric appliance 2, in which the diaphragm 25 of the appliance has a rod 35 connected with it, which operates upon a pivoted bell-crank device 36, the vertical arm of which constitutes an indicator, and also a contact maker and breaker; and this arm operated in connection with electric contact stops 37 on the main line of the system, so that when this indicator arm moves on to one or other of the stops 37, current flows through it and the diaphragm device 2, by the line connected with its diaphragm, to the automatic signaling appliance or appliances.

What I claim is:—

1. Electrical systems for transmitting temperature data from a distance, comprising in combination, thermo-electric means and line connections; appliances connected therewith for signaling automatically the maximum and minimum, and special temperature data; a main battery and line; means for testing and adjusting the main battery and line, and for testing the said thermo-electric means and line connections, comprising a key switch, an adjustable rheostat connected with the switch, and a resistance having a zero temperature co-efficient; and an adjustable rheostat in the main line connections of the thermo-electric means for adjusting and regulating the same; all combined and adapted to operate substantially as and for the purposes set forth.

2. Electrical systems for transmitting temperature from a distance, comprising in combination, thermo-electric means having maximum and minimum contacts; a temperature indicating instrument; electric connections between the means and the instrument; a key-switch which controls the electric connections between the instrument and the thermo-electric means for indicating the temperature of said means; relay instruments having switches and connected with the maximum and minimum contacts; an indicator connected with the relay instruments; a main battery; connections between said battery and said means and between said battery and said temperature indicating instrument; an adjustable rheostat which adjusts and regulates the connections with the thermo-electric means; a resistance having a zero temperature co-efficient and connected with the instrument, to enable the resistance of the thermo-electric means, the indicating instrument, battery and connections between these parts to be tested, and the resistance to be adjusted to a definite standard of resistance by the adjustable resistance connected with the thermo-electric means connections; an adjustable rheostat connected with the resistance; and a key switch which controls the connection and disconnection of the resistance and the rheostat with the instrument; substantially as set forth.

3. Electrical systems of transmitting temperature data from a distance, comprising in combination thermo-electric means; an indicating instrument; a battery and lines connected therewith; a key switch for controlling the instrument; maximum and minimum and special temperature transmitting and indicating means connected with the thermo-electric means; a key switch; an adjustable rheostat connected with the switch; a main battery and line; and a resistance having a zero temperature co-efficient connected therewith, arranged in connection with and for testing the said lines and indicating instrument and battery, substantially as and for the purposes set forth.

4. Electrical systems for transmitting temperature from a distance, comprising in combination, thermo-electric means; an indicating instrument; main electric connections between the means and instrument; a main battery and an adjustable rheostat in the connections; a resistance having a zero temperature co-efficient and electric connections between the instrument and the battery; and a key switch in the connections between the instrument and the battery; whereby the resistance of the main line connections can be tested and adjusted, and the measurement of the temperatures transmitted obtained; substantially as set forth.

5. Electrical systems for transmitting temperatures from a distance having a main line comprising thermo-electric means, an indicating instrument, battery and an adjustable rheostat; a secondary line comprising a resistance having a zero temperature coefficient; and a key switch connected with the secondary line and the indicating instrument, whereby the main line can be tested with the standard secondary line, and adjusted by the adjustable rheostat; substantially as set forth.

6. Electrical systems for transmitting temperature from a distance, comprising in combination, thermo-electric means; an indicating instrument; main electric connections between the means and instrument; a main battery and an adjustable rheostat in the connections; a resistance having a zero temperature co-efficient and electric connections between the instrument and the battery; a key switch in the connections between the instrument and the battery; and telephones connected with the indicating instrument and with the thermo-electric means and with the electrical connections between the instrument and the said means, whereby the resistance of the main line connections can be tested and adjusted, the instrument set relatively to the thermo-electric means, and the measurement of the temperature transmitted, obtained; substantially as set forth.

In testimony whereof I have signed my name to this specification in the presence of two subscribing witnesses.

ARTHUR BARRY.

Witnesses:
TOUREOVILLEO ROODALL,
ROBERT WITTER.